W. C. WHITTEMORE & W. E. HAMM.
PROPELLER MECHANISM FOR AIRCRAFT.
APPLICATION FILED APR. 8, 1916.
1,288,336.
Patented Dec. 17, 1918.
3 SHEETS—SHEET 3.
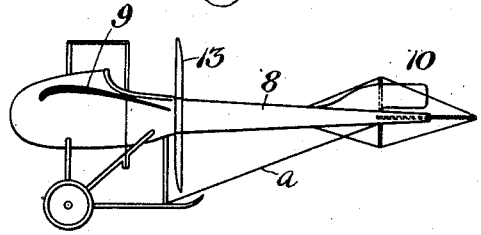
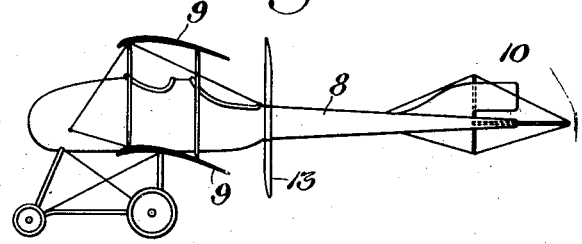
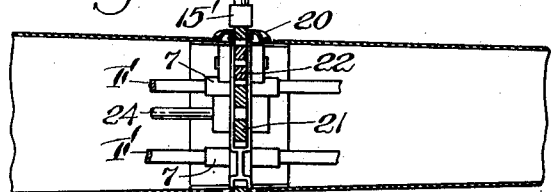
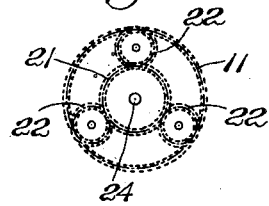
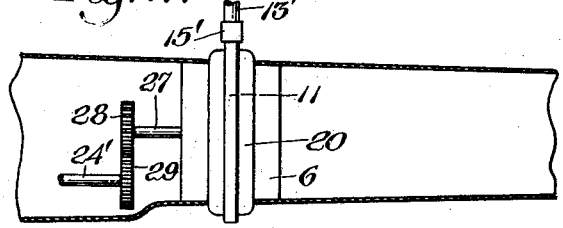
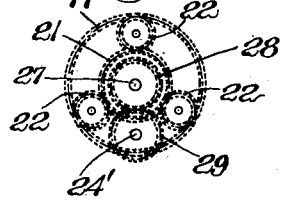
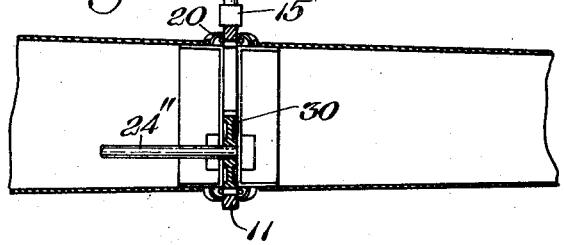
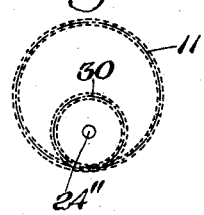
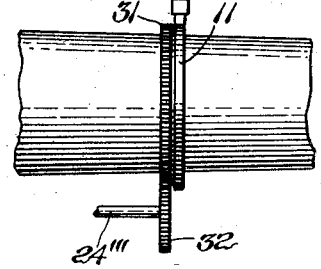
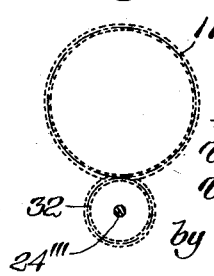

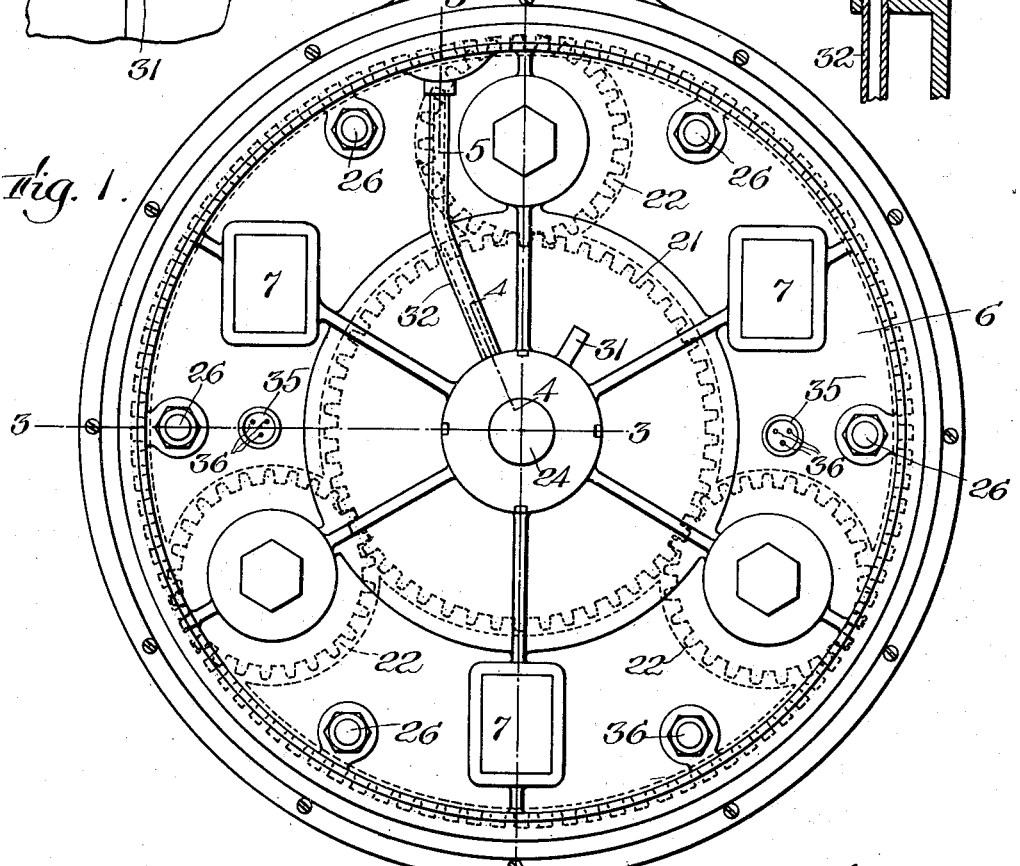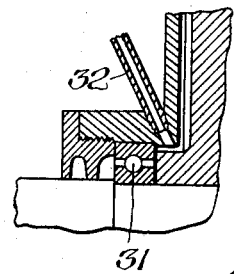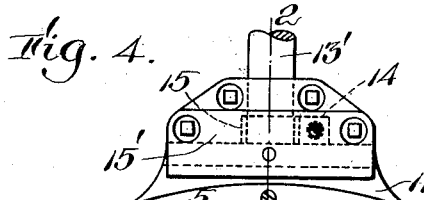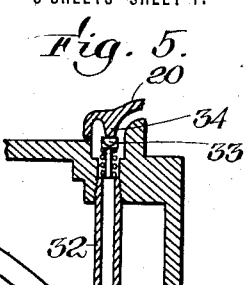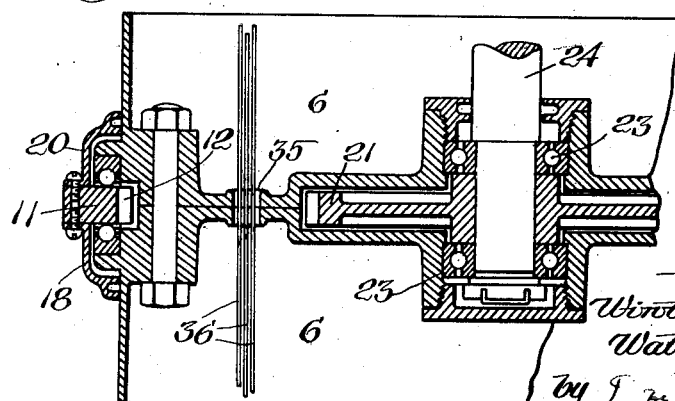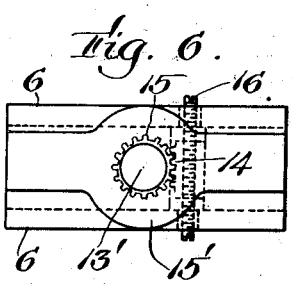

UNITED STATES PATENT OFFICE.

WINTHROP C. WHITTEMORE, OF MEDFIELD, AND WALTER E. HAMM, OF BOSTON, MASSACHUSETTS, ASSIGNORS TO WHITTEMORE HAMM COMPANY, OF BOSTON, MASSACHUSETTS, A CORPORATION OF MASSACHUSETTS.

PROPELLER MECHANISM FOR AIRCRAFT.

1,288,336.     Specification of Letters Patent.     Patented Dec. 17, 1918.

Application filed April 8, 1916. Serial No. 89,943.

*To all whom it may concern:*

Be it known that we, WINTHROP C. WHITTEMORE and WALTER E. HAMM, both citizens of the United States, and residents of Medfield, in the county of Norfolk and State of Massachusetts, and Boston, in the county of Suffolk and State of Massachusetts, respectively, have invented new and useful Improvements in Propeller Mechanism for Aircraft, of which the following is a specification.

This invention relates to propeller mechanism for air craft, and its principal object is to improve the construction and efficiency of aeroplanes, whether of the monoplane type, the biplane or other multiplane type, the tandem plane type, or other types, by revolving the propeller or propellers around the fuselage, so-called, that is, around the main structure which connects the planes or supporting surfaces with the rudder and elevator, or steering surfaces, such structure consisting of two or more main structural members. When the fuselage is covered with a shell or casing, or when it consists of a shell with or without an internal frame or reinforcing elements, the propeller is revolved around the shell.

Many advantages are gained by this construction. The propeller may be placed at the rear of the trailing edge of the supporting planes and back of the seat for the aviator and passengers. Thus, their view is not obstructed by the propeller and they are not in the path of air currents created by the propeller. The propeller thrust may be applied at approximately the center of resistance of the fuselage. A gun may be placed in advance of the propeller, the recoil of which will act along the line of the center of thrust of the propeller, thereby reducing the tendency of making the aeroplane unstable by the discharge of the gun. When the fuselage is covered with a tapering or spindle-like shell or casing, the current of air from the propeller impinging upon the tapering body will act to the advantage of forward motion, thereby in a measure counteracting head resistance. All the rods, cables, control wires, etc., may run through the propeller bearing or ring to the rudder, eleva or and other steering mechanisms. The propeller is in a safer and more protected position, and it may be supplemented if desired by a second propeller arranged on the front end of the machine in the usual manner, acting as a tractor, while our frame-encircling propeller acts as a pusher. In such case there might be two independent motors or power plants, the center of thrust of both of which could be in a direct line.

In the accompanying drawings which illustrate the invention,—

Figure 1 is an elevation of the mechanism, showing the relation of propeller, aeroplane framework, and propeller drive;

Fig. 3 is a section on line 3—3 of Fig. 1;

Fig. 4 is a detail in section on line 4—4 of Fig. 1;

Fig. 5 is a detail in section on line 5—5 of Fig. 1;

Fig. 6 is a detail view of adjustment means of one of the propeller blades viewed from the top of Fig. 1;

Figs. 9, 11, 13 and 15, illustrate in section and in side elevation various forms of gearing for propeller drives;

Figs. 10, 12, 14 and 16 are diagrammatic elevations of said drives, respectively;

Fig. 17 is a side view of a monoplane; and

Fig. 18 is a side view of a biplane, embodying the invention.

Figure 2:
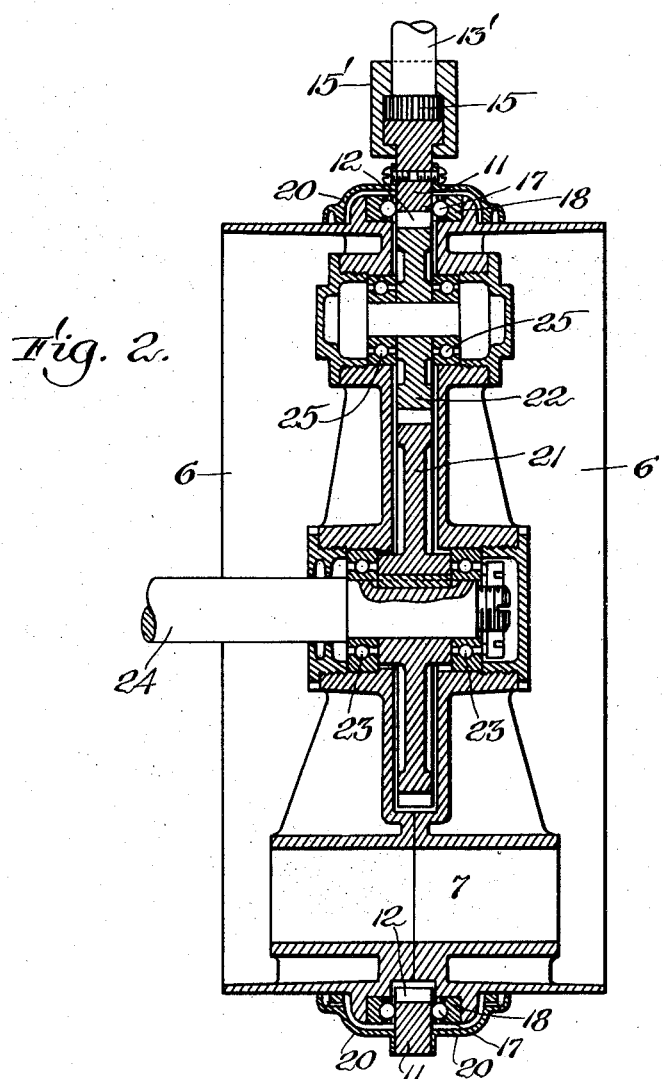
Fig. 2 is a vertical central section through line 2—2 of Fig. 1.

Referring first to Figs. 1, 2 and 3, the structure for carrying the propeller and the propeller driving mechanism, comprises the two disk-like castings 6, 6, made with marginal rims or flanges to which the shell or casing of the aeroplane body is secured at each side of the structure. Boxes or sockets 7 are formed in said castings, through which extend the longerons or main members F (9) of the frame. Said sockets 7 correspond in number and position to the three main lengthwise extending frame members F of the body of the aeroplane. Said frame members constitute the main framework of the machine, termed the fuselage, which may be covered by a casing or shell 8 (Figs. 17 and 18) forming a tapering or spindle-like body, and which carries the engine, the supporting planes 9, and the rudder and elevator, or steering surfaces, 10. There may of course be other braces or struts such as $a$ (Fig. 17) for reinforcing the body, outside of the periphery of the castings 6, and not surrounded or inclosed by the propeller, but the term fuselage as herein used designates the main framework, comprising two or more main frame members, around which the propellers revolve as hereinafter explained.

A propeller ring 11, formed with an internal gear 12, is seated in a circumferential bearing groove or channel on the periphery of the castings 6. Said propeller ring carries two or more propeller blades 13, the stems or shanks of which, 13', are angularly adjustable by a rack 14 and pinion 15, the rack being operated by an adjusting screw 16 mounted to turn in a box 15' secured to ring 11.

Figure 7:
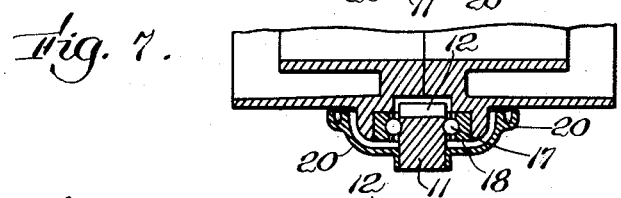
Figs. 7 and 8 are detail sections corresponding to the lower part of Fig. 2 showing modifications of the bearings for the internal gear propeller ring.
Figure 8:
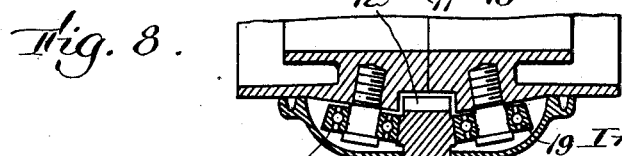

The propellers and propeller ring 11 revolve around the castings 6 and the fuselage, and the endwise thrust is received by antifriction bearings, such as ball bearings 17. In the form shown in Fig. 2 the balls run in a raceway in a bearing ring 18 mounted on the casting. In the form shown in Fig. 7 there is also a raceway in the side of the propeller ring 11, and in the form shown in Fig. 8 a series of ball bearing rollers 19 are mounted on the casting to engage each side of the propeller ring. In either case an annular shield or casing 20, constituting an oil retainer secured to ring 11, covers and protects the bearings, and prevents the throwing off of oil by centrifugal action.

In the form shown in Figs. 1, 2, 9 and 10 the propeller ring 11, is driven by a main central gear wheel 21 and three intermediate gear wheels or pinions 22, which mesh with gear wheel 21 and the internal gear 12 of the propeller ring. The gear wheel 21 is suitably journaled in ball bearings 23 held in journal boxes formed on the castings 6, and is keyed to a driving shaft 24, which is revolved by the engine. Similarly, the pinions 22 are journaled in ball bearings 25 held in journal boxes formed on the castings 6. The castings 6 are identical and are fastened together by bolts 26 with the several gear wheels held between them.

The lubrication of the device may be understood by reference to Figs. 1 to 5. Oil is introduced into bearing 23 from any suitable source of supply, through pipe 31 (Fig. 1). From bearing 23 the oil is distributed centrifugally between the casting disks 6, 6, to pinions 22 and their bearings, and thence to the internal gear 11 and bearings 17, and collected in the oil receiver 20. A pipe or duct 32 leads from the space within the oil receiver 20 back to the center bearing 23, and a spring pressed wiper 33 (Fig. 5) engages the flange 34 of the oil receiver 20, which revolves with the ring 11, and directs the oil back through pipe 32 to the center bearing where it is used over again.

In the modification shown in Figs. 11 and 12, the propeller ring is driven by intermediate gears 22, as before, and said gears 22 are driven by a central gear 21 fast on the short shaft 27. Gear 28 is also secured to shaft 27 and is driven by gear wheel 29 fast on driving shaft 24'.

In the form shown in Figs. 13 and 14, gear wheel 30 on driving shaft 24'', meshes directly with the internal gear on ring 11.

In the form shown in Figs. 15 and 16 the ring 11 is provided with an external gear 31, which is driven by a gear wheel 32 fast on driving shaft 24''' which is outside of the fuselage. Shaft 24''' may be connected by gearing, belt, or other suitable driving mechanism to a motor.

The castings 6, 6, are provided with suitable holes 35 (Figs. 1 and 3) through which the control wires or cables 36, pass from the aviator's position forward of the propellers to the rudder and other steering or controlling devices. There may be as many holes 35 as desired (two are herein shown) and there may be as many control members 36 as required for the particular steering mechanism used (three on each side being herein shown). Said control members thus all pass through the propeller bearing or ring.

From the foregoing it will be seen that the propeller revolves around the fuselage at the rear of the aviator's seat, and at the rear of the supporting planes, by which we mean the supporting planes 9 when machines of the type shown in Figs. 17 and 18 are used, or the forward planes in case the invention is applied to a machine having forward and rear planes arranged tandem fashion. Also in the preferred form the propeller revolves around the tapering shell of the fuselage whereby the current of air from the propeller acts on the tapering shell immediately at the rear of the propeller and so contributes to the forward propulsion of the machine.

We claim:

1. In an aeroplane having the shell of its fuselage transversely divided into two parts and having a propeller arranged to rotate in the plane of the division, the combination of front and rear disk-like members disposed in spaced relationship between said two parts of the fuselage, flanges on the front and rear disks respectively extending forwardly and rearwardly along the shell of the fuselage on each side of said division, the flanges being secured to the two portions of the shell, means for rigidly attaching the two disks together, and means disposed between the disks for rotating the propeller.

2. In an aeroplane having the shell of its fuselage transversely divided into two parts and having a propeller arranged to rotate in the plane of the division, the combination of front and rear disk-like members disposed in spaced relationship between said two parts of the fuselage, means for connecting the front and rear members respectively to the front and rear portions of the fuselage, means for connecting the two disks together at a plurality of points intermediate their centers and peripheries, and means disposed between said members for rotating the propeller.

3. An aeroplane comprising a fuselage, two disk-like members disposed transversely of the fuselage in spaced relationship, a propeller arranged to rotate around the fuselage in the region of said disks, and gears journaled in said disks for rotating said propeller.

4. An aeroplane comprising a fuselage, a propeller adapted to rotate around the fuselage, the propeller comprising a ring and blades secured thereto, roller bearings disposed on each side of said ring in engagement with the ring, the axes of the bearings being disposed obliquely with respect to the plane of the propeller so that the bearings position the propeller both laterally and radially.

5. An aeroplane comprising a fuselage shell, the shell being transversely divided into two parts with a gap therebetween, a disk disposed on each side of said gap, peripheral flanges on the disks secured to the two portions of the shell respectively, a propeller adapted to rotate around said gap, an internal gear on the propeller, a shaft journaled in said disks concentrically with said internal gear, an external gear mounted on said shaft between said disks, and a plurality of gears journaled in said disks in engagement with said internal and external gears.

6. An aeroplane comprising a fuselage, a propeller including a ring and blades secured thereto, means for rotating said ring about the fuselage, and means extending from said ring into juxtaposition to the fuselage to prevent oil being thrown outwardly from said rotating means.

7. An aeroplane comprising a fuselage, a propeller including a ring and blades secured thereto, means for rotating said ring about the fuselage, and means extending from said ring into juxtaposition to the fuselage to trap the oil thrown outwardly from said rotating means, and means automatically to conduct the oil back to the rotating means.

8. In an aeroplane having its fuselage transversely divided into two parts, the combination of a propeller arranged to rotate about the fuselage at the division between the two parts, means for rotatably supporting the propeller, and means overhanging the space between the two parts of the fuselage to prevent oil being thrown outwardly from said means.

9. In an aeroplane having a propeller arranged to rotate about the fuselage between the main aerofoils and the tail control aerofoils, the combination of disk-like members disposed in juxtaposed relationship on opposite sides of the transverse plane of the propeller respectively, and means for driving said propeller associated with said disks, said disks having alined openings therein adapted to permit the longerons of the fuselage to extend continuously therethrough.

10. In an aeroplane having the shell of its fuselage transversely divided into two parts and having a propeller arranged to rotate in the plane of the division, the combination of disk-like members disposed in spaced relationship in the opposed ends of the divided fuselage, means for securing said members to the respective parts of the fuselage along their outer peripheries, an internal gear disposed in the peripheral region of said disks for driving the propeller, an external gear disposed between said disks and concentrically therewith, a plurality of intermediate gears connecting said external gear with said internal gear, said intermediate gears being spaced about the annular space between the internal and external gears, and said disks having a plurality of alined openings spaced about said annular space between said intermediate gears to receive the fuselage longerons, whereby the longerons may extend continuously through said disks from one part of the fuselage to the other part.

11. In an aeroplane having the shell of its fuselage transversely divided into two parts and having a propeller arranged to rotate in the plane of the division, the combination of means within the fuselage for driving the propeller, means for rigidly connecting said two parts of the fuselage together, and means for controlling the aeroplane rudder extending across the space between said two parts of the fuselage within the confines of the fuselage, said driving means and connecting means being so arranged as not to interfere with the control means.

12. In an aeroplane having a propeller arranged to rotate about the fuselage between the main aerofoils and the tail control aerofoils, the combination of an internal gear for driving the propeller, drive gearing for transmitting power from the engine to said internal gear, and means for controlling the control surfaces in the rear of the propeller, said control means extending through said internal gear at a point or points radially displaced from the axis of the internal gear.

13. In an aeroplane having the shell of its fuselage transversely divided into two parts and having a propeller arranged to rotate in the plane of the division, the combination of disk-like members disposed in spaced relationship in the opposed ends of the divided fuselage, means for securing said members to the respective parts of the fuselage along their outer peripheries, an internal gear disposed in the peripheral region of said disks for driving the propeller, a central external gear disposed between said disks and concentrically therewith, a plurality of intermediate gears connecting said external gear with said internal gear, said intermediate gears being spaced about the annular space between the internal and external gears, said disks having one or more alined openings disposed in said annular space between said intermediate gears, and means for controlling the control surfaces in the rear of the propeller, said control means extending through said openings across the space between the two parts of the fuselage.

Signed by us at Boston, Massachusetts, this third day of April, 1916.

WINTHROP C. WHITTEMORE.
WALTER E. HAMM.